Oct. 5, 1926.  
G. H. GILMAN  
1,601,733  
DRILLING MACHINE  
Filed Feb. 11, 1920  
2 Sheets-Sheet 1

Inventor:
George H. Gilman.
by Emery, Booth, Janney & Varney Attys

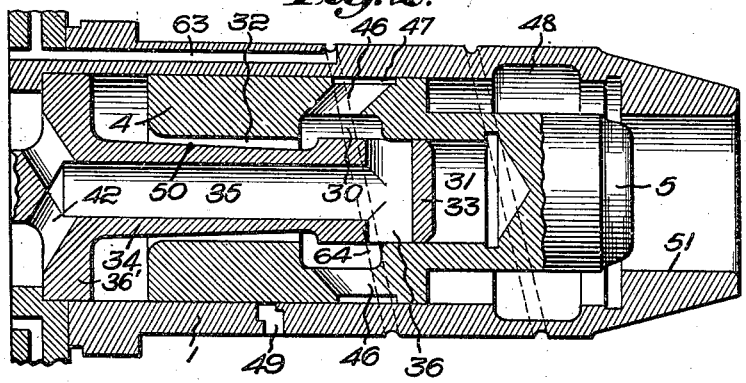
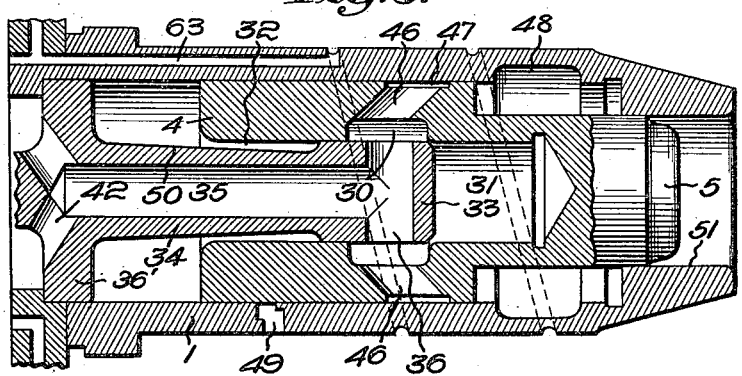
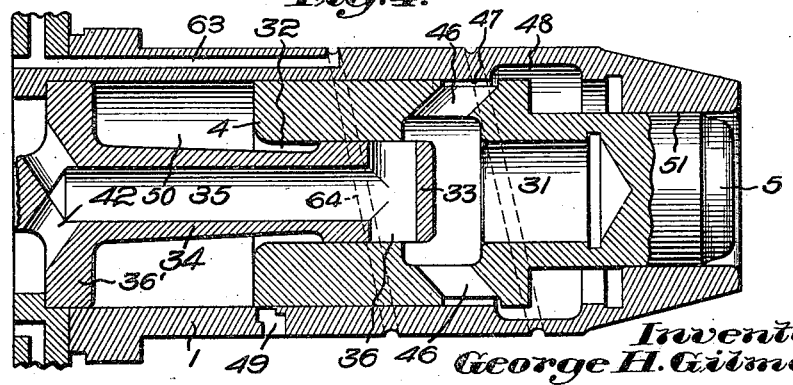

Patented Oct. 5, 1926.

1,601,733

UNITED STATES PATENT OFFICE.

GEORGE H. GILMAN, OF BOSTON, MASSACHUSETTS.

DRILLING MACHINE.

Application filed February 11, 1920. Serial No. 357,951.

My invention relates to rock drilling machines, and particularly, but not exclusively, is concerned with the lubrication thereof.

My invention will be best understood by reference to the accompanying drawing and specification which disclose the specific embodiment of my invention selected for illustrative purposes, while the scope of my invention will be more particularly pointed out in the appended claims.

In the drawings:

Fig. 2 shows diagrammatically the piston in the rearward portion of the cylinder; and Figs. 3 and 4 show diagrammatically the piston in intermediate portions of the cylinder.

Figure 1:
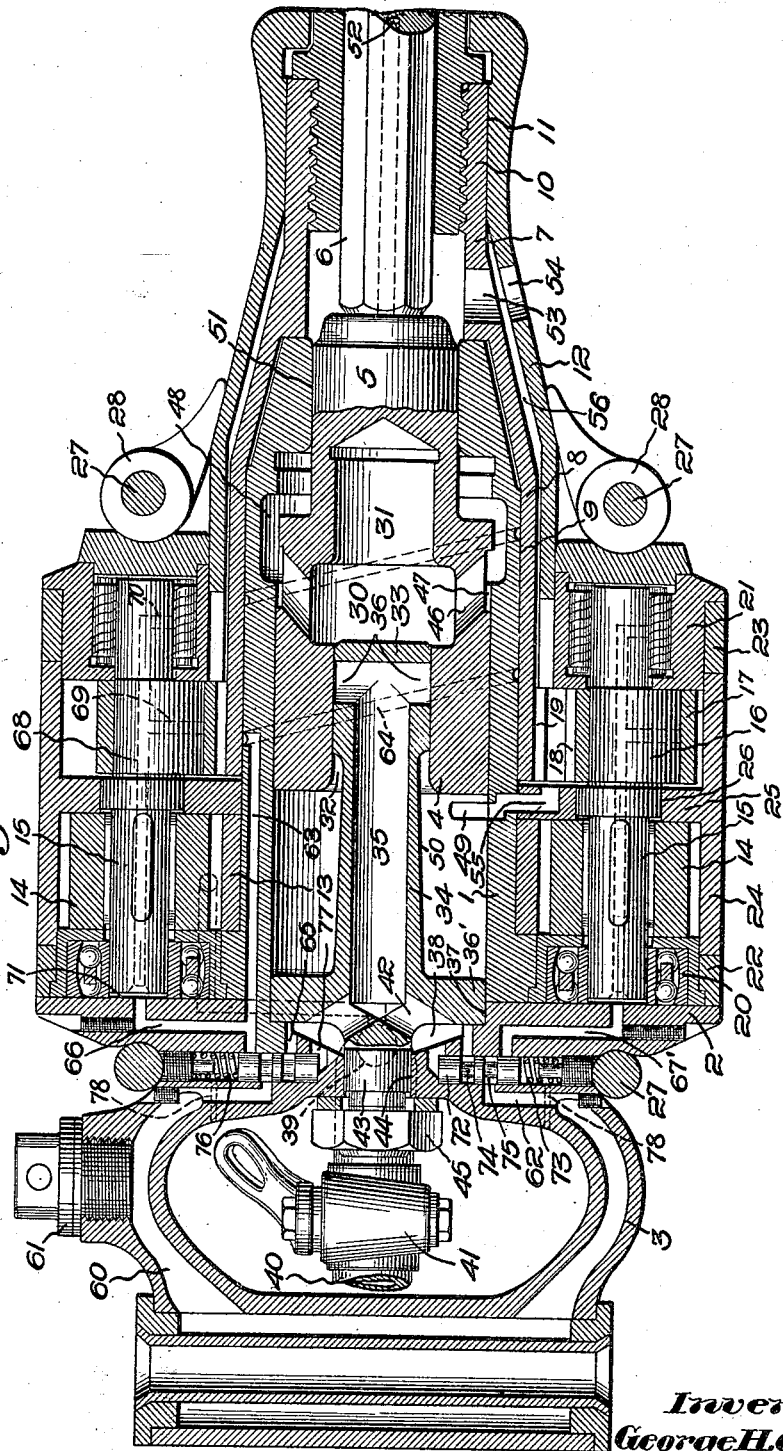
Fig. 1 is a longitudinal section of the submitted embodiment of my invention.

Generally speaking, the drilling machine of the submitted embodiment of my invention includes a percussive motor for imparting blows to the drill steel and a rotary motor for imparting rotation to the drill steel. The percussive motor comprises a cylinder member 1 which is secured to the base 2 of the handle member 3 and contains a piston 4, the hammer bar 5 of the piston being arranged to strike the end of the drill steel 6.

The drill steel is carried by the chuck 7, which chuck is provided with a rearward end 8 having an interior bearing 9 on the forward portion of the cylinder. The forward portion 10 of the chuck is provided with an exterior bearing 11 on the forward end of the chuck casing 12.

As shown, the chuck is rotated by means of an independent rotation motor comprising the rotor 13 and the rotary abutments 14. The rotor 13 surrounds and is rotatably supported by the cylinder. The abutments 14 are carried by shafts 15 which have formed therewith eccentrics 16, the latter driving a gyrating yoke 17, which has formed thereon the toothed portion 18 meshing with the toothed portion 19 on the rearward portion of the chuck.

The shafts 15 just referred to are rotatively supported in bearings 20 and 21 respectively carried by the flanges 22 and 23, the flanges respectively being formed on the rearward portion of the cylinder and the rearward portion of the chuck casing. Spacing the flanges and serving as a casing for the motor and gears is a member 24 provided with a partition 25 bearing on the cylinder, this partition forming bearings 26 for the shafts.

For holding the parts just mentioned in assembled relation I employ the yokes 27 clamped in position by means of the eccentric members 28.

As the general assemblage of instrumentalities entering into the drilling machine and the specific details and arrangement of parts for rotating the chuck are not claimed herein it is believed that the above description of these features is sufficient for purposes of this application.

In the submitted embodiment of my invention the piston 4 hereinbefore referred to has formed therein in a chamber 30 provided with the reduced portions 31 and 32 adapted to fit the exterior surface of the head 33 of the plug 34. The plug which is rigidly secured at the rear end of the cylinder is provided with a conduit 35 having laterally disposed openings 36 for conveying motive fluid to the chamber 30.

Communicating with the chamber 30 and with a groove 47 formed on the exterior surface of the piston, I provide passages 46 formed through the wall of the piston. When the piston is in its forward position, the groove 47 supplies motive fluid from the interior of the piston to the forward end of the cylinder through a groove 48 formed in the interior wall of the cylinder. For exhausting the rearward end of the cylinder I provide an exhaust port 49 which is so positioned as to be uncovered by the piston when it is at the forward part of its stroke. Under these conditions the piston moves rearwardly and when it has traveled sufficiently far to reach the rearward part of its stroke the exhaust port 49 is closed and motive fluid is admitted to the rear end of the cylinder. For admitting motive fluid to the rear end of the cylinder I form an exterior reduced portion 50 on the rearward end of the plug, which reduced portion will conduct motive fluid to the rearward end of the cylinder when the forward end of the bore 32 uncovers such reduced portion, as is shown by Fig. 2. For exhausting the forward end of the cylinder I so proportion the parts that when the piston is in its rearward position the forward end of the hammer bar 5 withdraws from the bore 51 formed in the forward portion of the cylinder. This causes the motive fluid in the front end of the cylinder to discharge into the chuck. From the chuck the motive fluid may pass into the bore 52 of the drill steel and to the atmosphere. For conducting the motive fluid from the chuck to the atmosphere I provide a passage 53 which is formed through the wall of the chuck and communicates with a passage 54 formed through the wall of the chuck casing. The relative proportions of the exhaust passing into the bore of the drill steel and to the atmosphere may be determined by variably restricting the cross-sectional area of the passage 54.

The rearward portion of the plug 34 I have shown formed with a flange 36' having a cylindrical exterior surface adapted to fit both the bore of the cylinder and the bore 37 of the recess 37 formed in the handle member, this construction serving to aline the parts. The base of the handle member is further formed with a cavity 38 which when the plug is placed in position forms a motive fluid supply chamber. Communicating with this chamber I have shown a passage 39 to which is connected the motive fluid supply conduit 40 controlled by a suitable valve 41. For establishing communication between the chamber 38 and the conduit 35, I have shown perforations 42 formed through the base of the plug. For securing the plug in position I have shown the same rearwardly of the flange 36' with an extension 43 which projects through a suitable perforation 44 formed through the base of the handle member, the end of the extension being screw-threaded and carrying a nut 45.

The operation of the piston is as follows:

Assuming the piston in the position shown by Fig. 2 and travelling forwardly, the throttle valve 41 being open, motive fluid will be discharged from the lateral passages 36 into the chamber 30 and from there by means of the reduced portion 50 of the plug will pass into the rearward end of the cylinder. The exhaust will be discharged from the forward end of the cylinder through the passages 53 and 54 in consequence of the hammer bar having withdrawn from the bore 51 of the cylinder.

When the piston has traveled forwardly to the position shown by Fig. 3, the air passing to the rearward end of the cylinder will have been cut off and will be working expansively. In this position the forward wall of the chamber 30 has uncovered the front end of the plug and motive fluid is being admitted into the chamber to act on the forward wall of the bore 31 which imparts further momentum to the piston.

When the piston has reached the position shown by Fig. 4, the passage 46 is beginning to discharge motive fluid into the front cylinder chamber and the piston has partially closed the passage 36. As the piston at this time is moving at a high velocity, the internal chamber of the piston is rapidly expanding and the port 46 is rapidly opening, and in consequence, the air admitted to the front end of the cylinder is at a considerably reduced pressure and does not materially cushion the blow of the piston.

As the forward effective cross-sectional area of the piston is greater than that of the internal piston chamber, the piston in the position of Fig. 1 moves rearwardly, due to a differential expansion of the motive fluid, the exhaust port 49 at this time being open. I so proportion the parts that when the piston in its rearward stroke reaches approximately the position shown by Fig. 4, additional air is supplied to the front cylinder chamber in order to keep up the pressure.

After the piston on its rearward stroke reaches the position shown by Fig. 3, the live air which has entered the reduced portion 31 of the internal piston chamber is trapped and compressed to a high degree of pressure. This cushions the piston during the final part of its rearward stroke and aided by the air admitted to the rearward end of the cylinder, when the piston reaches the neighborhood of the position shown by Fig. 2, starts the piston forwardly with great velocity.

It will be noted that the mechanism of the drilling machine so far described comprises a plurality of motors, namely, the percussive motor having a part which provides a chuck bearing, and a chuck rotating motor which includes as parts thereof shafts and eccentric bearings. These motors and parts in the submitted embodiment of my invention, are lubricated in the manner which will now be set forth.

As illustrated, I provide the handle or other portion with a lubricant reservoir which is adapted to be filled through the cap 61. From the lubricant reservoir leads a discharge passage 62 from which lubricant may be distributed to conduits conveying the lubricant to the parts of the percussive and chuck rotating motors necessary to be lubricated.

For distributing the lubricant I have shown a lubricant conveying conduit 65 which leads to the chamber 38, the lubricant discharged mixing with the motive fluid whence it passes into the percussive motor through the conduit 35 and to the chuck rotating motor through its supply conduit 66. The lubricant passing into the chuck rotating motor lubricates the various parts thereof while that passing into the percussive motor lubricates the bearing surfaces of the cylinder, piston and plug.

Leading through the base of the handle member and the wall of the cylinder I have shown a lubricant conveying conduit 63 which leads to the part of the cylinder providing the interior bearing for the chuck. Lubricant is distributed over this part by means of helical grooves 64 formed on the exterior wall of the cylinder.

Communicating with the passage 63 I have shown a lubricant conveying conduit 66 and also provide a conduit 67' both adapted to convey lubricant to the bearing portions of the chuck rotating motor and the gear teeth of the reduction gear. For distributing the lubricant carried by the conduits 66 and 67' I herein provide the shafts with longitudinally extending bores 68 and communicating therewith bores 69 and 70 respectively leading to the eccentric and forward shaft bearings. Lubricant for the rearward shaft bearing may pass thereto through the space 71 at the end of the shaft.

For discharging lubricant from the conduit 62 to the conduits 63, 65 and 67' hereinbefore referred to, I have shown valve-like members or plungers 72 which are reciprocably mounted in chamber 73. These valve-like members herein are provided with reduced portions 74 and 75 so arranged that when the members are in the position shown by Fig. 1, the chambers formed by the portions 75 are filled with lubricant, and the lubricant which has previously filled the chambers formed by the reduced portions 74 is discharged into the conduits 65. When the valve-like members 72 are at the opposite ends of their respective bores 73, the lubricant which has previously filled the chambers formed by the reduced portions 75 is discharged into the conduits 67 and 67', and the chambers formed by the reduced portions 74 are again filled with lubricant.

In the embodiment of my invention submitted, the valve-like members are biased in one direction, by means of springs 76 which tend to hold the valve-like members in the positions shown by Fig. 1 of the drawings. As illustrated, communicating with the respective bores 73 at the ends thereof opposite the ends receiving the springs are passages 77 in communication with the chamber 38, the latter communicating with the air line 40 and the passage 35 leading to the percussive motor.

As will be obvious, if the springs 76 exert a greater pressure on the valve-like members than the lowest pressure to which the opposite ends thereof are subjected, and a lower pressure thereon than that exerted by the maximum pressure of the motive fluid, the valve-like members will be reciprocated as the pressure rises and falls. If a relatively heavy spring is used, the valve-like members will be caused to reciprocate in synchronism with the piston, for the reason that the pressure in the chamber 38 rises and falls as the flow of motive fluid through the passage 35 increases and diminishes. Preferably, however, I use much lighter springs which are of such strength that they will only overcome the pressure exerted on the valve-like member when the throttle valve 41 is closed.

Suitable vents 78 may be provided to draw off the oil which may leak past the valve-like member to the outer end of the bores 73.

The motor and gearing arrangement for driving the chuck shown herein forms the subject matter of my co-pending applications Serial Nos. 350,577 and 354,536, respectively filed January 10, 1920 and January 28, 1920.

Although I have described one specific embodiment of my invention it is to be understood that my invention is not limited to the specific mechanical details of this embodiment, but that wide deviations may be made therefrom without departing from the spirit of my invention.

Claims:

1. In a motor, a source of motive fluid supply, a source of lubricant supply, a plurality of parts to be lubricated, separate lubricant conveying passages leading to said parts, and means responsive to the pressure condition in said motor for distributing said lubricant to said passages to one of said passages under one pressure condition and to another of said passages under another pressure condition.

2. In a drilling machine, a fluid operated motor, a motive fluid conduit for said motor, a source of lubricant supply, a part to be lubricated, a lubricant conveying passage independent of said motive fluid conveying conduit and leading to said part, and means responsive to the pressure condition in said conduit for supplying measured quantities of lubricant from said source to said passage.

3. In a drilling machine, a fluid operated motor, a motive fluid conduit for said motor, a source of lubricant supply, a part to be lubricated, a lubricant conveying passage independent of said motive fluid conveying conduit and leading to said part, and means responsive to the pressure condition in said conduit for supplying lubricant from said source to said lubricant conveying passage under one pressure condition in said motive fluid conveying conduit and excluding lubricant from said passage under another pressure condition in said conduit.

4. In a drilling machine, a drill steel, a fluid operated percussive motor mechanism for actuating said steel, mechanism for moving said steel angularly, a motive fluid conduit for said motor, a source of lubricant supply, a passage independent of said motive fluid conduit and leading to said second named mechanism, and means responsive to the pressure condition in said conduit for supplying lubricant from said source to said passage.

5. In a drilling machine, a drill steel, a fluid operated motor mechanism for actuating said steel, a motive fluid conduit for said motor mechanism, lubricant distributing means responsive to the pressure condition in said conduit and operative to lubricate said motor mechanism under one pressure condition, and other mechanism lubricated by said lubricant means under another pressure condition.

6. In a drilling machine, a fluid pressure motor having a throttle valve, a plurality of parts to be lubricated, a source of lubricant supply, and means for causing lubricant to be supplied to one of said parts when said throttle valve is in one position and to be supplied to another of said parts when said throttle valve is in another position.

7. In a drilling machine, a fluid pressure motor having a throttle valve, a plurality of parts to be lubricated, a source of lubricant supply, and pressure responsive means for causing when said throttle valve is in one position a supply of lubricant to one of said parts and when in another position a supply of lubricant to another of said parts.

8. In a drilling machine, a fluid pressure motor having a throttle valve, a plurality of parts to be lubricated, a source of lubricant supply, and pressure responsive means for causing lubricant to be supplied to one of said parts when said throttle valve is opened and to be supplied to another of said parts when closed.

9. In a drilling machine, a drill steel, a fluid actuated percussive mechanism for said steel and having a throttle valve, mechanism for rotating said steel, separate lubricant delivery passages leading respectively to said mechanisms, and means controlled by movement of said throttle valve for supplying lubricant to said passages.

10. In a drilling machine, a drill steel, a fluid actuated percussive mechanism for said steel and having a throttle valve, mechanism for rotating said steel, separate lubricant delivery passages leading respectively to said mechanisms, and pressure responsive means controlled by movement of said throttle valve for supplying lubricant to said passage.

11. In a drilling machine, a drill steel, a fluid actuated percussive mechanism for said steel, a manually operated throttle valve for said machine, mechanism for rotating said steel, a source of lubricant supply, separate passages for conveying lubricant to said mechanisms respectively, and means controlled by movement of said throttle valve for selectively distributing lubricant from said source to said passages.

12. In a drilling machine, a drill steel, a fluid actuated percussive mechanism for said steel and having a controlling valve, mechanism for rotating said steel, and means for lubricating one of said mechanisms when the valve is in one position and the other of said mechanisms when it is in another position.

13. In a drilling machine, a plurality of parts to be lubricated, a controlling valve, a source of lubricant supply, and a plurality of lubricating devices for independently controlling passage of lubricant from said supply to said parts, and means responsive to variations in pressure caused by said controlling valve for actuating said devices.

14. In a fluid actuated drilling machine, a plurality of parts to be supplied with lubricant, a source of lubricant supply, fluid actuated means providing a plurality of movable chambers for independently controlling the passage of lubricant from said source to said parts, and conduit means coacting with said chambers for causing lubricant to be delivered to one part independently of the other.

15. In a drilling machine, a plurality of parts to be supplied with lubricant, a source of lubricant supply, fluid actuated means providing a plurality of movable chambers for controlling the passage of measured quantities of lubricant from said source to said parts, independent passages cooperating with the respective chambers for conducting lubricant therefrom to said parts, and a valve for controlling the fluid for actuating said means.

16. In a drilling machine, a plurality of parts to be supplied with lubricant, a source of lubricant supply, fluid actuated means providing a plurality of movable chambers for independently controlling the passage of lubricant from said source to said parts, a source of pressure fluid supply for said machine, a part supplied with pressure-fluid from said source, and a passage for conducting pressure fluid from the last named part to said means.

17. In a motor, a motive fluid supply conduit, a source of lubricant supply, means providing a chamber adapted to be alternately placed in communication with said conduit and said source, and means responsive to the pressure condition in said conduit for establishing such alternate communication.

18. In a rock drill, a cylinder structure, front and rear head structures therefor, an oil reservoir in one of said structures, a motive fluid conduit, means providing a movable chamber adapted alternately to be placed in communication with said reservoir and conduit, and means for moving said first means to establish such communication.

19. In a drilling machine comprising a motor and having parts to be lubricated, means for conveying pressure fluid to and through said motor, means for changing the pressure condition in said motor, a source of lubricant supply, means providing a lubricant receiving chamber, conduit means adapted to convey lubricant from said source to said chamber, conduit means adapted to convey lubricant from said chamber to said parts to be lubricated, and means responsive to said pressure condition for alternately placing said chamber in and out of communication with each of said conduit means.

20. In a drilling machine, comprising a motor and having parts to be lubricated, means for conveying motive fluid to and through said motor, means for changing the pressure condition in said means, a source of lubricant supply, conduit means having a plurality of intake openings and adapted to convey lubricant to said parts, and means responsive to the changes in pressure condition for alternately supplying lubricant from said source to said intakes.

21. In a drilling machine, comprising a motor and having parts to be lubricated, means for conveying motive fluid to and through said motor, means for changing the pressure condition in said means, a source of lubricant supply, conduit means having a plurality of intake openings and adapted to convey lubricant to said parts, and means responsive to the changes in pressure condition for supplying lubricant from said source to one of said intakes at one pressure condition and to another of said intakes at another pressure condition.

22. In a drilling machine, comprising a motor and having parts to be lubricated, means for conveying motive fluid to and through said motor, means for changing the pressure condition in said means, a source of lubricant supply, means providing a plurality of chambers adapted to be supplied with lubricant from said source, and means responsive to changes in pressure condition for placing one of said chambers in communication with one of said intakes at one pressure condition and another of said chambers in communication with another of said intakes at another pressure condition.

23. In a drilling machine, a fluid operated percussive motor, a fluid operated chuck rotating motor, conduit means for conveying motive fluid to said motors, a reduction gearing, and fluid operated means for independently lubricating said motors and said gearing, and conduit means for conveying lubricant to said gearing independently of said first named conduit means.

24. In a drilling machine, a fluid operated percussive motor, a fluid operated chuck rotating motor, a reduction gearing, sources of lubricant and motive fluid supply, and fluid operated means for supplying lubricant to the motive fluid for said motors and for supplying lubricant directly to said gearing.

25. In a drilling machine, a fluid operated percussive motor, an auxiliary fluid operated motor, each of said motors having bearing surfaces subjected to the motive fluid in its passage through the machine and other bearing surfaces, automatic means for supplying lubricant to the motive fluid for said motors, and means responsive to fluid pressure for automatically lubricating said other bearing surfaces of said motors when said motors are in operation.

26. The combination with a plurality of motors, of conduit means for conducting fluid to and through one of said motors, conduit means for conducting fluid to and through another of said motors, means for changing the pressure condition in one or more of said conduit means, a source of lubricant supply, conduit means connecting said source to one or more parts to be lubricated of one or more of said motors and to one or more of the first mentioned conduit means, means responsive to pressure permitting a discharge of lubricant through the third mentioned conduit means to one or more of said parts of one or more of said motors when the motive fluid in one of said first mentioned conduit means is at one pressure condition, and means responsive to pressure permitting a similar discharge to one or more of the said first mentioned conduit means when the motive fluid in the other of said first mentioned conduit means is at another pressure condition.

27. In a rock drill, a fluid actuated percussive motor, a drill rotating mechanism, a plunger chamber having a reciprocable plunger, said plunger chamber and plunger being formed to provide a plurality of movable lubricant receiving chambers, a spring for moving said plunger toward one end of said plunger chamber, said plunger having a pressure surface subjected to the pressure of the fluid for actuating said percussive motor whereby said fluid will move said plunger in one direction and said spring will move it in the opposite direction, a lubricant reservoir; separate passages leading from said plunger chamber to said reservoir, said drill rotating mechanism and percussive motor; and said passages opening into said plunger chamber in such position as to cause said lubricant receiving chambers alternately to be supplied with lubricant from said lubricant reservoir and alternately to discharge said lubricant into said other passages.

In testimony whereof, I have signed my name to this specification.

GEORGE H. GILMAN.